United States Patent [19]
Olds

[11] Patent Number: 5,832,275
[45] Date of Patent: Nov. 3, 1998

[54] SYSTEM FOR DYNAMICALLY REPLACING OPERATING SOFTWARE WHICH PROVIDES DISTRIBUTED DIRECTORY SERVICE AFTER VERIFYING THAT VERSIONS OF NEW SOFTWARE AND THE OPERATING SOFTWARE ARE COMPATIBLE

[75] Inventor: Dale R. Olds, Sandy, Utah

[73] Assignee: Novell, Inc., Orem, Utah

[21] Appl. No.: 871,569

[22] Filed: Jun. 4, 1997

Related U.S. Application Data

[63] Continuation of Ser. No. 355,356, Dec. 13, 1994, abandoned.
[51] Int. Cl.[6] .............................. G06F 9/44; G06F 9/445
[52] U.S. Cl. ......................... 395/712; 395/500; 707/511; 707/203
[58] Field of Search .................................... 395/712, 500, 395/425; 707/511, 203; 380/23

[56] References Cited

U.S. PATENT DOCUMENTS

| 5,155,847 | 10/1992 | Kirouac et al. | 395/712 |
|---|---|---|---|
| 5,212,789 | 5/1993 | Rago | 707/8 |
| 5,237,614 | 8/1993 | Weiss | 380/23 |
| 5,307,498 | 4/1994 | Eisen et al. | 395/704 |
| 5,321,841 | 6/1994 | East et al. | 395/677 |
| 5,339,403 | 8/1994 | Parker | 711/221 |
| 5,359,730 | 10/1994 | Marron | 395/200.51 |
| 5,491,817 | 2/1996 | Gopal et al. | 707/200 |
| 5,495,612 | 2/1996 | Hirayama et al. | 395/685 |
| 5,513,351 | 4/1996 | Grantz | 707/200 |

FOREIGN PATENT DOCUMENTS 0 426 911 A1  11/1989  European Pat. Off. .
WO 94/01819  1/1994  WIPO .

OTHER PUBLICATIONS

Increasing System Availability through On–Line Software Version Change, Deppak Gupta, Pankaj Jolete, Department of Computer Science and Engineering, Indian Institute of Technology, Kanpur—208016, India, Jun. 26, 1993.
NetWare 4.0: A Direction to the Enterprise, Ben Ruiz and John Herron, LAN Systems, Inc., Sep. 21, 1992.

Primary Examiner—Le Hien Luu
Attorney, Agent, or Firm—Dinsmore & Shohl LLP

[57] ABSTRACT

The present invention provides a method and apparatus for dynamically updating computer programs that are providing X.500 directory services without interruption of service. Upon receiving a call to update a computer program providing directory services, a process or thread is executed that authenticates the user making the reload request, loads a program loader, renames the then currently running directory services program, and calls another process or thread, while it awaits completion of the second process or thread. The second process or thread loads and initializes the new directory services computer program and then interacts with the program loader and the new directory services computer program to determine if the old and new directory services programs are compatible. If the old and new directory services computer programs are not compatible, the second process or thread aborts the load and transmits an abort signal to the first process or thread. If the old and the new directory services computer programs are compatible, the second process or thread transmit a commit signal to the first process or thread. The first thread upon receiving a commit signal from the second process or signal removes itself and the old directory services computer program from memory. Upon receiving an abort signal from the second process or thread, the first process or thread changes the name of the old directory services computer program back to its original name and unload itself and the loader program.

18 Claims, 3 Drawing Sheets

SYSTEM FOR DYNAMICALLY REPLACING OPERATING SOFTWARE WHICH PROVIDES DISTRIBUTED DIRECTORY SERVICE AFTER VERIFYING THAT VERSIONS OF NEW SOFTWARE AND THE OPERATING SOFTWARE ARE COMPATIBLE

This is a continuation of application Ser. No. 08/355,356, filed Dec. 13, 1994, now abandoned.

BACKGROUND

The present invention relates to the management of distributed digital network directories, and particularly to providing dynamic updates to the computer programs supporting distributed directory services.

Technological advances in microelectronics and digital computing systems have resulted in the proliferation of digital computer networks, enabling the distribution of networking services across a wide range of computers participating in the network and over various communications media. Advances in distributing applications have also resulted in a client-server architecture for applications. Under the architecture, the portions of the application that interact with the user are typically separated from the portions of the application that fulfill client processing requests. Typically, the portions of an application that interact with the user are called a client applications or client software, whereas the portions of the application that service requests made by the client applications are called a server applications or server software. In a network environment, the client applications and server applications are generally executed on different computers.

Historically, digital networks in the form of local area networks, a physical collection of personal computers interconnected with network cabling and network interface cards, comprised a single network server and multiple network clients. To manage which network clients could access the network server, as well as what files, printers, printer queues, and server applications were available to the network clients, the network server maintained information on each of the resources that were attached to the server, the identities of the network clients and users who could use the services of the network server, and the scope and nature of the services available to the network clients and users.

As local area networks became more popular, networks grew in size requiring several servers to service the needs of users. With increased size and complexity of networks, came the need for easier management of network servers. Users required access to an increasing number of services that were located on an increasing number of network servers. Several vendors began offering networking servers. Each vendor implemented a different scheme of providing networking services information. In addition, because of the way the server maintained information about only its networking services, each network server still required management of its resources independent of other network servers.

This insular method of maintaining information of networking services fueled research and development of distributed networking directories that span networking servers. Thus far, research has resulted in several potential solutions. Three technologies currently hold greater promise for replacing the large number of insular, idiosyncratic directories that now litter many an enterprise's numerous local-area networks and electronic-mail systems. One of the more popular approaches exploits the X.500 distributed network information directory services protocol developed as published by the CCIT and Open Systems Interconnect consortium.

However, while the X.500 protocol appears to hold the greatest promise to provide a robust, distributed directory, the X.500 protocol has been slow to gain acceptance. The X.500 protocol has been plagued from the start with management, interoperability and security problems. The X.500 protocol specification describes a technical framework, interoperability requirements and compliance criteria but does not describe specific implementations. Thus many of the details of implementation have been left up to systems providers.

The X.500 protocol specification describes a distributed directory. The directory provides information services to network clients. The information in the directory can be read as well as modified by users who have applicable access rights.

The information stored in the directory is stored in the form of a schema, a collection of objects with associated attributes or properties tied together by their relationship to each other. FIG. 1 shows an object called "Computer" with a few associated attributes, such as owner, operator, status, etc. The values of the properties are not shown in the figure but an example of a value for "Owner" might be "Fred." Objects in the directory and their names correspond to things that humans relate to when dealing with computers, namely, users, printers, print queues, networks and information. Objects such as countries, organizations, networks, people and computers are objects you might find in the directory as well.

The directory provides information to users by giving users a hierarchical view of all of the information contained in the directory. The hierarchical view is generally in the form of a tree. FIG. 2 shows a directory. Each of the branches and terminating points or leaves represent objects in the directory. Generally, implementations of the directory organize objects in subtrees, partitions or domains. FIG. 2 also shows the directory organized into partitions or domains. Multiple copies of each partition may be stored in the directory. Software schemas define and determine the number and types of replicas of each partition.

Multiple replicas of a partition are needed to reduce network storage and traffic requirements and speed up directory searches. Replicas are stored in name servers. A name server is a computer in the network, usually a network server. More than one partition can be stored in a name server. Partitions stored in a name server need not be contiguous.

The directory tree provides a logical means of searching for information. The tree is generally patterned after logical groupings such as organizations, organizational units, computers and users. These logical groupings, while extremely useful in helping users find relevant information also creates significant problems in managing the directory.

Each partition forms a major subtree of the directory. Taken together, the partitions form a hierarchical tree of partitions that leads back to a root partition containing the root directory. Where boundaries of two partitions meet, the partition closer to the root is considered superior, and the partition farther from the root is considered subordinate. Thus, FIG. 2, partitions E and C are subordinate to the other partitions.

The present invention solves one of the problems associated with a distributed directory. As distributed directories become more popular, more and more users will rely on them for access to data and services. As user rely on directories more heavily, the time in service of the directory will be critical. Users will not tolerate even a temporary shut down of the directory or a portion of the directory.

SUMMARY OF THE INVENTION

With the present invention the computer programs that provide the services associated with a distributed directory can be dynamically updated without a significant interruption in services. Time in service of the directory will thus increase, increasing user confidence in the directory.

BRIEF DESCRIPTION OF THE DRAWINGS

The present invention may be more fully understood by reference to the following Detailed Description in conjunction with the Drawings, in which.

DETAILED DESCRIPTION OF THE INVENTION

The present embodiment of the invention, Novell's NetWare Directory Service or NDS, supports dynamically updating the computer programs that provide distributed digital directories. NDS operates in the NetWare network operating system environment.

The invention is enabled through a NetWare Core Protocol verb. NDS design builds on several previously implemented capabilities of NetWare, including the NetWare Core Protocol ("NCP"). The first capability relevant to the invention is NetWare's native network layer protocol, IPX. IPX provides end-to-end datagram delivery over network media and over internetworks.

NDS allows multiple independent name trees to coexist in the same internetwork without interfering with each other. A rendezvous feature is defined allowing a client interested in a name tree to locate NDS name servers. The rendezvous feature builds on another previously implemented capability of NetWare: SAP (Service Advertising Protocol). Routers in all installed NetWare internetworks convey SAP information for client/server rendezvous. With NDS, SAP has a narrowly confined role: a client uses it to find its first NDS name server.

Figure 1:
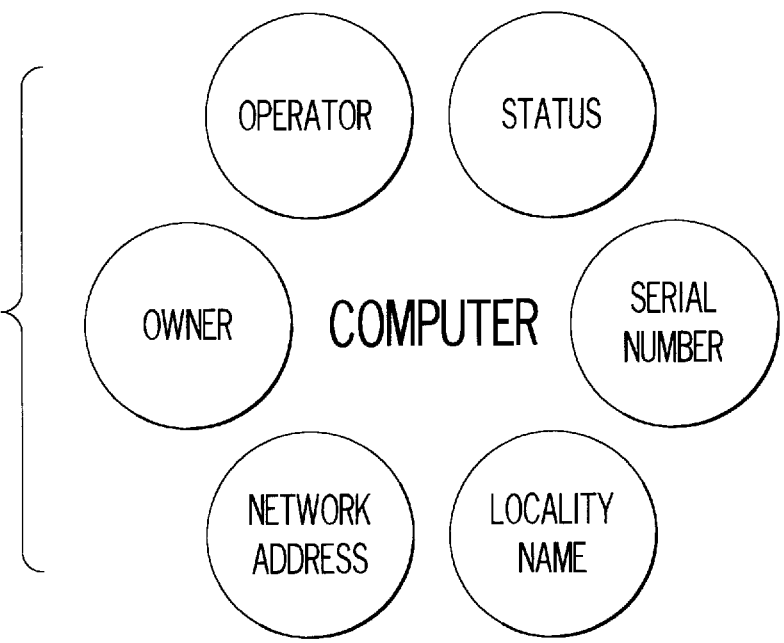
FIG. 1 shows a typical directory object, a computer, with some of its associated attributes.
Figure 2:
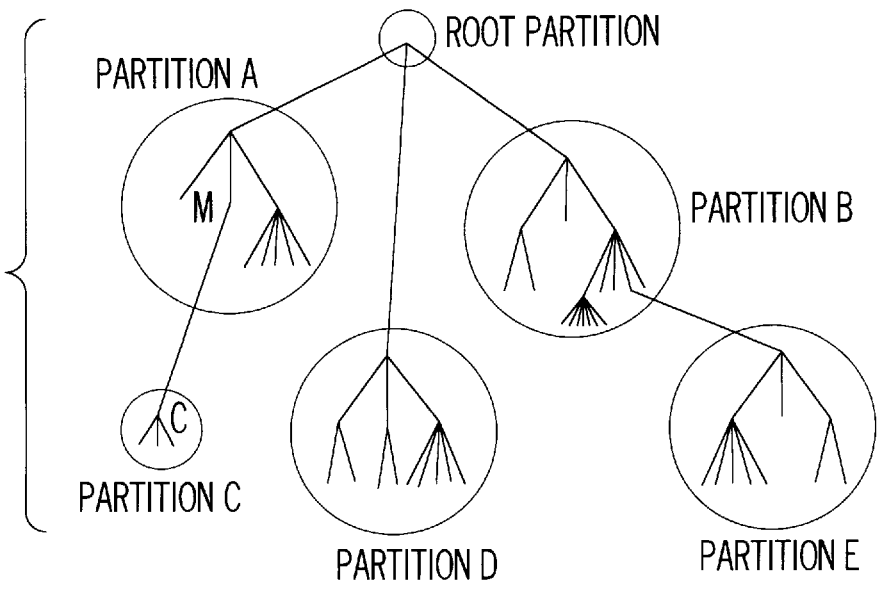
FIG. 2 shows a typical directory tree.
Figure 3:
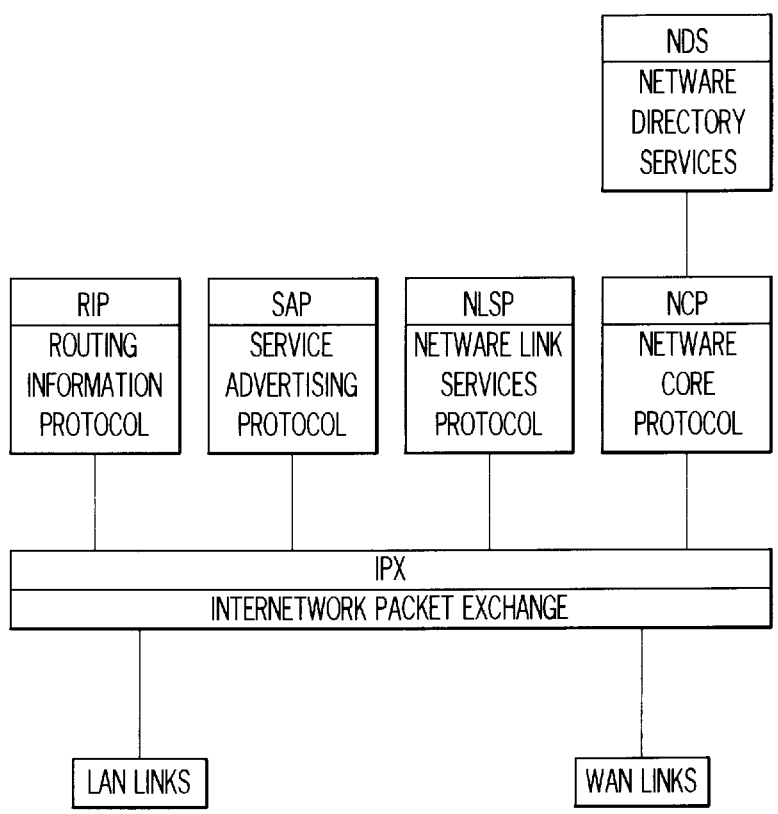
FIG. 3 shows the network protocol environment in which the present embodiment of the invention is implemented.

The NCP sits above the network layer. See FIG. 3. NCP supports many networking services, such as file services. Certain operations on an NCP connection are specific to NDS. Once an NCP connection exists, it can also convey NDS requests and replies. Because NDS uses messages that can be quite large, it employs a fragmentation protocol to convey an NDS message in (possibly) several NCP packets.

Each NCP packet begins with a small message header that carries general status information about the current state of the connection between the client and the server. The client request header is seven bytes long, while a server's reply header is eight bytes long. As shown below, the RequestType variable defines the type of network request. A type of 0x1111 is reserved for connection allocation services; a type of 0x2222 is reserved for server request services; a type of 0x3333 is reserved for server responses; a type of 0x5555 is reserved for destroying connections; and a type of 0x9999 is reserved for work in progress responses.

| Reload Verb 0x2222 104 8 | Content | | Type |
|---|---|---|---|
| Request Format Offset | | | |
| 0 | RequestType | (0x2222) | WORD |
| 2 | SequenceNumber | (LastSeq+1) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | FunctionCode | (104) | BYTE |
| 7 | SubFuncCode | (08) | BYTE |
| Reply Format Offset | | | |
| 0 | Reply Type | (0x3333) | WORD |
| 2 | SequenceNumber | (LastSeq+1) | BYTE |
| 3 | ConnectionLow | (ServiceConn) | BYTE |
| 4 | TaskNumber | (CurrentTaskNum) | BYTE |
| 5 | ConnectionHigh | (ServiceConn) | BYTE |
| 6 | CompletionCode | (Ccode) | BYTE |
| 7 | ConnectionStatus | (StatusFlag) | BYTE |
| 8 | NDSErrorCode | (NDSError) | 4 BYTES |
| 12 | Reserved | | 4 BYTES |

The sequence number maintains a numeric counter for all incoming requests to provide reply prioritization. The ConnectionLow and the ConnectionHigh numbers identify a particular service connection between the client and the server. The TaskNumber distinguishes which client process or thread is making the request to the server.

The present embodiment of the invention uses the Reload Directory Services NCP. The Reload Directory Services NCP allows the principal computer program that provides directory services in the NetWare environment, DS.NLM, to be replaced on disk and reloaded in a server while that server is active and while other computer programs, NetWare Loadable Modules or NLMs in the NetWare environment, of the server are actively referencing NDS entry points.

Three NLMs are involved. The DSLOADER.NLM contains the directory entry points to which all other NLMs actually link, including the current DS.NLM in memory and a new DS.NLM on disk which is to replace the current DS.NLM.

Figure 4:
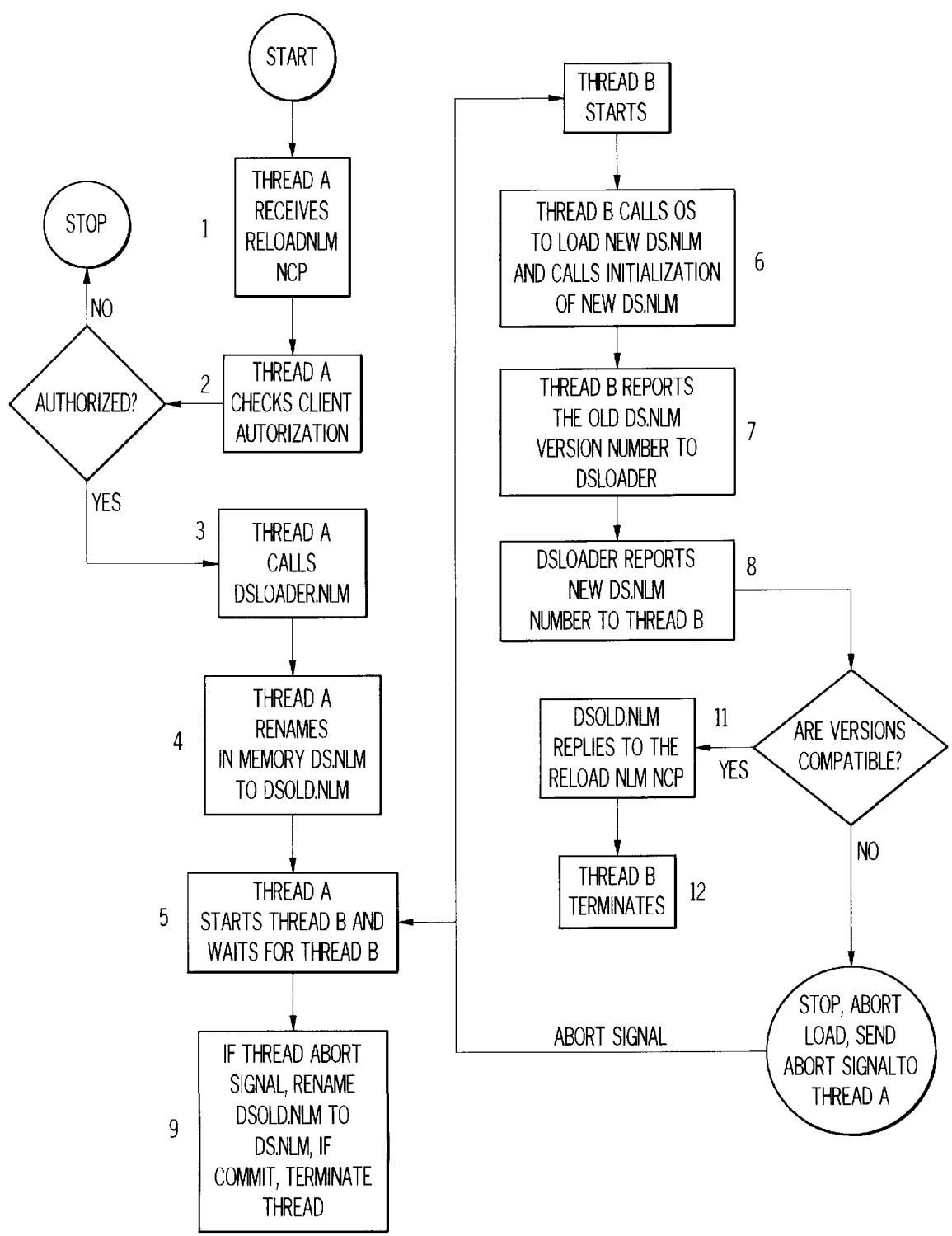
FIG. 4 shows the software algorithm employed by the invention to dynamically update a directory services module without interruption of services.

Referring to FIG. 4 and the code segments provided in Tables 1–5 the dynamic update aspect of the invention is performed by two threads of execution within the NetWare operating system. The first thread (A) is the thread that begins servicing the NCP request, the other thread (B) is started by thread (A) to complete the reload of the new DS.NLM. The replacement algorithm is as follows:

1. Thread (A) receives the RELOAD NLM NCP request in a function that is part of the currently loaded DS.NLM.
2. Thread (A) checks the client authorization.
3. If the client has proper authorization, usually the highest level of security clearance allowed by the system, thread (A) calls the DSLOADER and requests a reload.
4. Thread (A) renames the memory image of the currently loaded DS.NLM to DSOLD.NLM.
5. Thread (A) starts thread (B) and then waits until thread (B) reports whether or not the load was successful.
6. Thread (B) calls the operating system to load the new DS.NLM. This loads the new DS.NLM and then calls DS.NLM's initialization function.

7. While initializing the new DS.NLM, thread (B) reports the new DS.NLM version number to DSLOADER and retrieves from DSLOADER the DSOLD.NLM version number. The DSLOADER may reject the load with an error response or it may return the new DS.NLM version number.
8. Thread (B) will abort the load on an error from the loader, or if the new DS.NLM rejects the version number returned by DSLOADER. Thread (B) will indicate to thread (A) if it aborts or commit to continue the load.
9. Thread (A) detects the abort or commit state transition from thread B. If the load is aborted thread (A) renames the DSOLD.NLM back to DS.NLM in memory. It then returns from the loader.
10. The DSOLD.NLM replies to the NCP request.
11. If Thread (B) commits to continue the load it waits for thread (A) to complete the response to the NCP, then it will unload DSOLD.NLM and continue with the initialization of the new DS.NLM.
12. Thread B terminates itself.

TABLE 1

Code Segments Implementing Steps 1–3 and 10

```
int ReloadDS(int conn)
{
    int err = 0, managesEntry;
    THREADDATA td;
    /* 1. begin servicing reload NCP */
    if (err =. DSAClientStart(TD_CHECK_OPEN, conn, -1, -1, &td))
        return err;
    /* 2. check client authorization */
    if (IsSupervisor(conn)
            || !(err = GlobalCheckManagement(ServerID(), ID_SELF,
&managesEntry, 0))
            && managesEntry)
        err = DSLReload(DSModuleHandle()); /* 3. call loader */
    else if (!err)
        err = ERR_NO_ACCESS;
    /* 10. reply to the NCP */
    return DSAClientEnd(err);
}
```

TABLE 2

Code Segments Implementing Steps 4–5 and 9

```
int DSLReload(uint32 moduleHandle)
{
    /* 4. rename DS.NLM to DSOLD.NLM */
    struct LoadDefinitionStructure *mh = (struct LoadDefinitionStructure
*)moduleHandle;
    char savedName[sizeof(mh->LDFileName)];
    if (!mh)
        mh = (struct LoadDefinitionStructure *)registeredModule;
    else if (moduleHandle != registeredModule)
        return ERR_INVALID_REQUEST;
```

TABLE 3

Code Fragments Implementing Step 6 and part of 8

```
void ReloadWorker(void)
{
    unsigned long oldModule = registeredModule;
    if (dslState != DSL_ACTIVE)
        return;
    /* 6. call load function */
    if (loadError = LoadDSNLM())
    {
        /* 8. indicate the abort state change */
```

TABLE 3-continued

Code Fragments Implementing Step 6 and part of 8

```
        if (dslState == DSL_ACTIVE)
            dslState = DSL_ABORTED;
    }
    else if (dslState == DSL_CORPSE)
    {
        if (oldModule)
        {
            DelayMyself(18, timerTag);
            KillMe(oldModule);
        }
        dslState = DSL_IDLE;
    }
}
```

TABLE 4

Code Fragments Implementing Step 7 and the Remainder of Step 8

```
int RegisterWithDSLoader(void)
{
    int err;
    uint32 dslVersion, loadedDSVersion;
    int i;
    /* ... */
    /* 7. negotiate versions with loader. Handle loader's rejection */
    if (err = DSLNegotiateVersions(DSVersion(), &dslVersion,
&loadedDSVersion))
        return err;
    if (!ACCEPTABLE_DSLOADER_VERSION(dslVersion))
        return ERR_INVALID_DS_VERSION; /* reject the loader */
    /* 8. commit to load new NLM, this changes loader state */
    if (err =. DSLRegister(DSModuleHandle(), DSVersion(), &ddsFuncs,
&emuFuncs,
            DSCanUnload, DSUnload, &dslMemTag, dslCommandLine))
        return err;
    /* continue NLM initializations */
    /* ... */
    return 0;
}
```

TABLE 5

Code Fragments Implementing DSLoader Response to Step 7

```
int DSLNegotiateVersions(uint32 dsVersion, uint32 *dslVersion,
        uint32 *registeredDSVersion)
{
    *dslVersion = INTERNAL_VERSION;
    *registeredDSVersion = registeredVersion;
    dsVersion = dsVersion;
    return ACCEPTABLE_DS_VERSION(dsVersion)?
        0: ERR_INVALID_DS_VERSION;
}
```

As indicated by the above method, the computer programs providing services to a distributed directory can be dynamically updated without interruption of directory services. Thus, critical directory related services can be updated and new service enhancements can be added without interruption.

Although one embodiment of the invention has been illustrated and described, various modifications and changes may be made by those skilled in the art without departing from the spirit and scope of the invention.

I claim:

1. A method, in a computer network, of dynamically replacing a first computer module with a second computer module, comprising the steps of:

a. receiving a request to replace the first computer module, said first computer module having instructions for supporting a distributed director;

b. calling a loader computer module for managing the replacement of the first computer module with the second computer module, said loader computer module operating independent of the state information of the first or second computer modules;

c. loading the second computer module to replace the first computer module while the first computer module is supporting the distributed directory, said second computer module having instructions for supporting a distributed directory;

d. verifying version numbers of the first and section computer modules; and e. making active the second computer module and unloading the first computer module if the version numbers indicate that the first and second computer modules are compatible.

2. A method as recited in claim 1, wherein the second computer module includes service enhancements comprising increased or decreased functionality which can be implemented independent of the conditions required to implement the functionality of the first module.

3. A method as recited in claim 1, further comprising the step of: checking that the request to update has valid authorization prior to calling the loader computer module.

4. A method as recited in claim 1, further comprising the step of: checking that the second computer module is compatible with the first computer module prior to making inactive the first computer module.

5. A method as recited in claim 1, wherein the first and second computer modules are NetWare loadable modules.

6. A method as recited in claim 1, further comprising, prior to step (c) the step of renaming the first computer module from a first name to a second name while the first module is supporting the distributed service.

7. A method as recited in claim 6, wherein the second computer module is named the first name when loaded.

8. A method of dynamically replacing an old computer module providing one or more distributed services being used on a server in a client/server network with a new computer module, wherein the new computer module includes service enhancements, said method comprising the steps of:

a. receiving a request to replace the old computer module having instructions for supporting a distributed directory;

b. calling a loader computer module by the old computer module, said loader computer module operating independent of the state information of the old and new computer modules and being adapted for managing the replacement of the old computer module with the new computer module;

c. loading the new computer module to replace the old computer module while the old computer module is supporting the distributed directory in the network, which is initiated by the loader computer module;

d. checking that the new computer module is compatible with the old computer module by verifying version numbers of the old and new computer modules; and e. making active the new computer module and unloading the old computer module by the loader computer module if the new computer module is compatible with the old computer module.

9. A method as recited in claim 8, wherein the service enhancements comprise modified, added, or reduced functionality relative to the old computer module.

10. A method as recited in claim 9, wherein the functionality of the service enhancements can be implemented independent of the conditions required to implement the functionality of the old computer module.

11. A method as recited in claim 8, further comprising the step of: checking that the request to update has valid authorization prior to calling the loader computer module.

12. A method as recited in claim 8, wherein the old and new computer modules are NetWare loadable modules.

13. A computer system, comprising:

a. a first computer interconnected to a plurality of other computers such that the computers are capable of sending and receiving signals to and from one another;

b. memory residing in said first computer;

c. a first computer module in said memory providing a distributed directory to at least one of said plurality of computers, said first computer module having entry points in said memory and having an associated version;

d. a second computer module in said memory having service enhancements to the first computer module, said second computer module having entry points in said memory and having an associated version; and e. a loader computer module containing entry points for the first and second computer modules and operating independent of the state information of the first and second computer modules, said loader computer module being capable of managing the replacement of the first computer module with the second computer module without interrupting the operation of the distributed directory and unloading the first computer module from said memory if the associated versions are compatible.

14. A computer system as recited in claim 13, wherein the service enhancements comprise modified, added, or reduced distributed services relative to the first computer module.

15. A computer system as recited in claim 13, wherein the first module is a server in a client/server network.

16. A computer readable medium comprising a program capable of dynamically replacing a first computer module supporting a distributed directory with a second computer module by performing the steps of:

a. receiving a request to replace the first computer module;

b. calling a loader computer module for managing the replacement of the first computer module with the second computer module while the first computer module is supporting the distributed directory said loader computer module operating independent of the state information of the first and second computer modules;

c. loading the second computer module to replace the first computer module;

d. comparing version numbers of the first and second computer modules; and e. making active the second computer module and unloading the first computer module if the version numbers indicate compatibility.

17. An apparatus comprising one or more processors and memory, the memory comprising:

a first memory space storing a first module accessible by at least one of said processors, said first module being operative to support a distributed directory;

a second memory space storing a second module accessible by at least one of said processors in lieu of the first module; and a third memory space storing a loader module accessible by at least one of said processors, said loader module operating independent of the state information of the first and second modules and being operative to compare version numbers between the first and second modules and to manage the dynamic replacement of the first module with the second module while the first module is supporting the distributed directory by making active the second module and unloading the first module from the first memory space if the version numbers indicate compatibility between the first and second modules.

18. An apparatus as recited in claim 17, further comprising a fourth memory space storing a first name associated with the first module and a fifth memory space storing a second name, wherein the loader module is further operative to change the association of the first module from the first name to the second name and is further operative to associate the second module with the first name.

* * * * *

UNITED STATES PATENT AND TRADEMARK OFFICE
CERTIFICATE OF CORRECTION

PATENT NO. : 5,832,275
DATED : 11/3/98
INVENTOR(S) : Dale R. Olds

It is certified that error appears in the above-identified patent and that said Letters Patent is hereby corrected as shown below:

Claim 1, column 7, line 3, change [director] to -- directory --;

column 7, line 14, change [section] to -- second --.

Claim 16, column 8, line 47, change [directory] to -- directory, --.

Signed and Sealed this

Thirteenth Day of April, 1999

Attest:

Q. TODD DICKINSON

Attesting Officer      Acting Commissioner of Patents and Trademarks